April 1, 1958     E. T. LORIG     2,828,852
ROLLER CONVEYOR
Filed Dec. 27, 1955
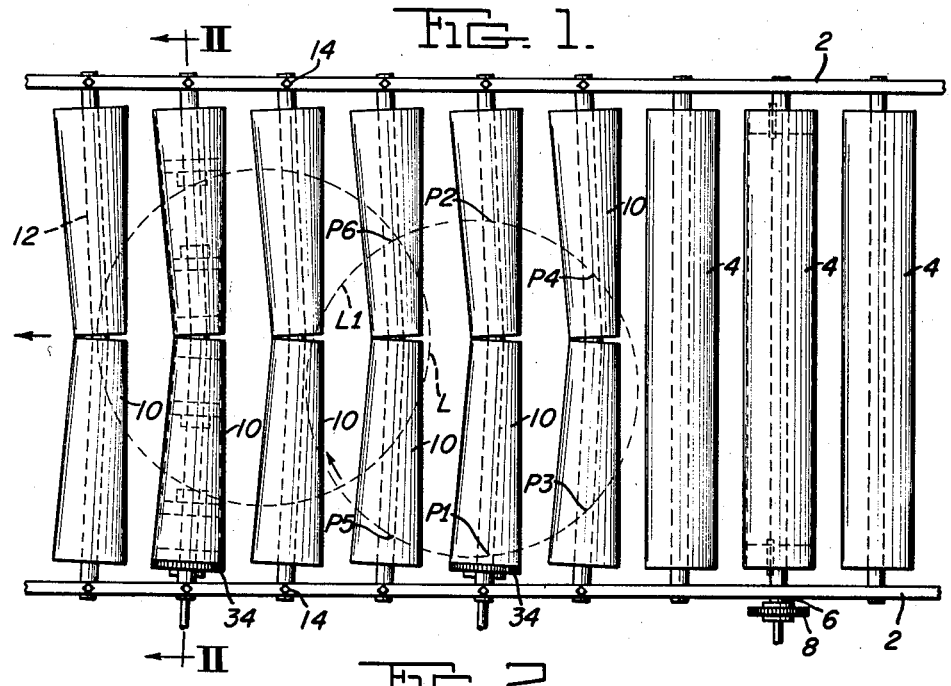
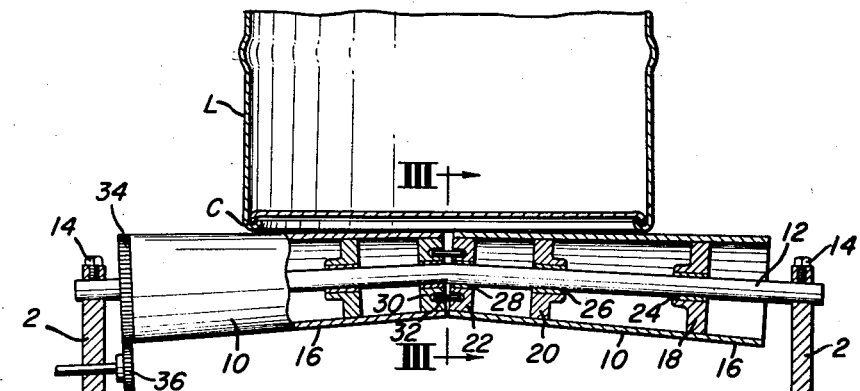
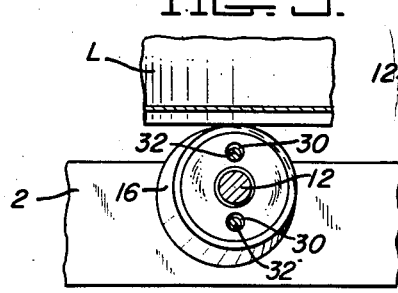
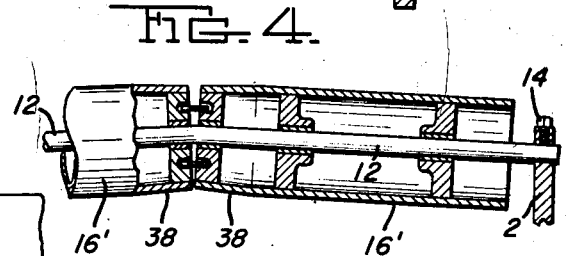
INVENTOR:
EDWIN T. LORIG,
BY: Donald G. Dalton
his Attorney.

United States Patent Office 2,828,852
Patented Apr. 1, 1958

2,828,852

ROLLER CONVEYOR

Edwin T. Lorig, Pittsburgh, Pa., assignor to United States Steel Corporation, a corporation of New Jersey Application December 27, 1955, Serial No. 555,472

8 Claims. (Cl. 198—127)

This invention relates to roller conveyors and more particularly to conveyors which can center objects having their weight resting on the rolls in the boundary region of the object such as inverted tubs, barrels, drums, crates, and the like. Such conveyors may be power driven or of the gravity type. A roller conveyor suitable for this purpose is disclosed in the patent to Orr No. 2,682,333, dated June 29, 1954. However, the cost of the patented conveyor is rather high and it has certain other disadvantages.

Other roller conveyors as shown in my prior Patent No. 2,622,720, dated December 23, 1952, have tapered self-centering rolls with the large diameters adjacent each other at the pass line. This causes barrels with chimes as well as short objects and packages to rotate outwardly from the pass line as they are forwarded over the rolls from an off-center position, thus creating a lateral force detrimental to the centering and aligning action of these objects.

It is therefore an object of my invention to provide a simple, inexpensive, roller conveyor which will center and align objects supported on their outer boundaries.

This and other objects will be more apparent after referring to the following specification and attached drawings, in which:

Figure 1 is a top plan view of the roller conveyor of my invention;

Figure 2 is a view taken on the line II—II of Figure 1;

Figure 3 is a view taken on the line III—III of Figure 2; and

Figure 4 is a fragmentary view showing a modified roll structure.

Referring more particularly to the drawings, the reference numeral 2 indicates the framework for supporting the rollers of the conveyor. The entry end of the conveyor is preferably provided with cylindrical rollers 4. The number of such rollers will vary depending upon the size of the object to be handled. One of the rollers 4 is preferably provided with a shaft extension 6 having a gear 8 mounted thereon so that it can be driven. The remaining length of the conveyor is provided with self-centering rollers 10. Each of the rollers 10 is supported on a bent shaft 12 which is carried by the framework 2. Shaft 12 may be rotated to change its position and is held in adjusted position by means of set screws 14 carried by the framework 2. Each of the rollers 10 includes a pair of generally frusto-conical shaped rolls 16 mounted on the shaft 12 with the small diameter ends adjacent each other. Each of the rolls 16 is preferably provided with spaced webs 18, 20 and 22 having bearings 24, 26 and 28 at their inner portion surrounding the shaft 12. The webs 22 of the rolls in each roller are provided with openings 30 for receiving pins 32 whereby the rolls of each roller must rotate at the same angular velocity. Object L may be conveyed along the conveyor by gravity or certain of the rollers 10 may be driven. In the latter case a gear 34 is mounted on the large diameter end of one of the rolls 16 and is driven from pinion 36. It will be seen that the rolls 16 rotate about an axis that extends from the inner end of the roll downwardly and away from the direction of approach of the object L being conveyed. In the embodiment shown the rolls 16 are so arranged that the outer end thereof is below the inner end but this arrangement is not absolutely necessary. In the embodiment shown in Figure 4 the rolls 16' are shown as generally cylindrical but with slightly tapered portion 38 at its inner end. The rolls 16' are arranged on the shaft 12 in the same manner as the rolls 16, taper 38 being such that the top of the roll 16' is substantially horizontal. This taper may also be provided on the roll 16 but it is not absolutely necessary to the proper functioning of the conveyor.

The operation of the device is as follows:

Assuming that the load L is placed on the conveyor to the left of the center line looking from the entry end, the initial shock will be taken up by the cylindrical rollers 4. When the load L reaches the centering rollers 10 it will be in the position indicated as L1. The load will be slightly tilted and its center of gravity will be outward from the center of the base of the load L. As shown, the load L is a barrel having circular chimes C extending into contact with the conveyor. With the load in the position shown at L1 the pressure on the rolls at P1, P3 and P5 will be greater than average and the pressure at P2, P4 and P6 will be less than average. When the inner part of the roll is above the outer part and the outer diameter of the roll is greater than the inner diameter the barrel will rotate in the direction of the arrow to increase the centering action of the conveyor. If the load is placed off-center to the right the action is opposite to that discussed above. After the barrel L becomes centered it will remain in centered position as it passes along the conveyor.

While two embodiments of my invention have been shown and described it will be apparent that other adaptations and modifications may be made without departing from the scope of the following claims.

I claim:

1. A roller conveyor for automatically centering objects having chimes on the bottom thereof comprising a plurality of rollers arranged transversely of the path of movement of said objects, a bent shaft for supporting each of said rollers, each of said rollers including a pair of rolls having the diameter of their outer ends at least as great as the diameter of their inner ends, each of said rolls being journaled on its associated shaft for rotation about an axis that extends from the inner end of the roll downwardly and away from the direction of approach of said objects, and a connection between the rolls of each roller for positively causing them to rotate at the same angular velocity.

2. A roller conveyor for automatically centering objects having chimes on the bottom thereof comprising a plurality of rollers arranged transversely of the path of movement of said objects, a bent shaft for supporting each of said rollers, each of said rollers including a pair of rolls having the diameter of their outer ends at least as great as the diameter of their inner ends, each of said rolls being journaled on its associated shaft for rotation about an axis that extends from the inner end of the roll downwardly and away from the direction of approach of said objects, the rolls being so arranged that the outer end thereof is below the inner end, a connection between the rolls of each roller for positively causing them to rotate at the same angular velocity, and a plurality of generally cylindrical rolls mounted at the entry end of said conveyor.

3. A roller conveyor for automatically centering objects having chimes on the bottom thereof comprising a plurality of rollers arranged transversely of the path of movement of said objects, a bent shaft for supporting each of said rollers, each of said rollers including a pair of rolls having the diameter of their outer ends at least as great as the diameter of their inner ends, each of said rolls being journaled on its associated shaft for rotation about an axis that extends from the inner end of the roll downwardly and away from the direction of approach of said objects, the rolls being so arranged that the outer end thereof is below the inner end, the inner end of each roll being so shaped that the top thereof is substantially horizontal, and a connection between the rolls of each roller for positively causing them to rotate at the same angular velocity.

4. A roller conveyor for automatically centering objects having chimes on the bottom thereof comprising a plurality of rollers arranged transversely of the path of movement of said objects, a bent shaft for supporting each of said rollers, each of said rollers including a pair of rolls having the diameter of their outer ends at least as great as the diameter of their inner ends, each of said rolls being journaled on its associated shaft for rotation about an axis that extends from the inner end of the roll downwardly and away from the direction of approach of said objects, the rolls being so arranged that the outer end thereof is below the inner end, the inner end of each roll being so shaped that the top thereof is substantially horizontal, a connection between the rolls of each roller for positively causing them to rotate at the same angular velocity, and a plurality of generally cylindrical rolls mounted at the entry end of said conveyor.

5. A roller conveyor for automatically centering objects having chimes on the bottom thereof comprising a plurality of rollers arranged transversely of the path of movement of said objects, a bent shaft for supporting each of said rollers, each of said rollers including a pair of generally frusto-conical shaped rolls mounted on said shaft with their small diameter ends adjacent each other, each of said rolls being journaled on its associated shaft for rotation about an axis that extends from the inner end of the roll downwardly and away from the direction of approach of said objects, the rolls being arranged so that the outer end thereof is below the inner end, and a connection between the rolls of each roller for positively causing them to rotate at the same angular velocity.

6. A roller conveyor for automatically centering objects having chimes on the bottom thereof comprising a plurality of rollers arranged transversely of the path of movement of said objects, a bent shaft for supporting each of said rollers, each of said rollers including a pair of generally frusto-conical shaped rolls mounted on said shaft with their small diameter ends adjacent each other, each of said rolls being journaled on its associated shaft for rotation about an axis that extends from the inner end of the roll downwardly and away from the direction of approach of said objects, the rolls being so arranged that the outer end thereof is below the inner end, a connection between the rolls of each roller for positively causing them to rotate at the same angular velocity, and a plurality of generally cylindrical rolls mounted at the entry end thereof.

7. A roller conveyor for automatically centering objects having chimes on the bottom thereof comprising a plurality of rollers arranged transversely of the path of movement of said objects, a bent shaft for supporting each of said rollers, each of said rollers including a pair of generally frusto-conical shaped rolls mounted on said shaft with their small diameter ends adjacent each other, each of said rolls being journaled on its associated shaft for rotation about an axis that extends from the inner end of the roll downwardly and away from the direction of approach of said objects, the rolls being arranged so that the outer end thereof is below the inner end, the inner end of each roll being shaped so that the top thereof is substantially horizontal, and a connection between the rolls of each roller for positively causing them to rotate at the same angular velocity.

8. A roller conveyor for automatically centering objects having chimes on the bottom thereof comprising a plurality of rollers arranged transversely of the path of movement of said objects, a bent shaft for supporting each of said rollers, each of said rollers including a pair of generally frusto-conical shaped rolls mounted on said shaft with their small diameter ends adjacent each other, each of said rolls being journaled on its associated shaft for rotation about an axis that extends from the inner end of the roll downwardly and away from the direction of approach of said objects, the rolls being arranged so that the outer end thereof is below the inner end, the inner end of each roll being so shaped that the top thereof is substantially horizontal, a connection between the rolls of each roller for positively causing them to rotate at the same angular velocity, and a plurality of generally cylindrical rolls mounted at the entry end of said conveyor.

References Cited in the file of this patent

UNITED STATES PATENTS

| | | |
|---|---|---|
| 2,198,656 | Conn et al. | Apr. 30, 1940 |
| 2,686,590 | Sloane | Aug. 17, 1954 |